US005562293A

United States Patent [19]
Bartusch

[11] Patent Number: 5,562,293
[45] Date of Patent: Oct. 8, 1996

[54] STRIPPING RING

[75] Inventor: Joachim Bartusch, Ingelheim, Germany

[73] Assignee: Greene, Tweed of Delaware, Inc., Wilmington, Del.

[21] Appl. No.: 493,868

[22] Filed: Jun. 23, 1995

[30]  Foreign Application Priority Data

Jun. 25, 1994 [DE]  Germany ........................ 44 22 295.5

[51] Int. Cl.⁶ ...................................................... F16J 15/54
[52] U.S. Cl. ............................. 277/24; 277/203; 74/459; 74/424.8 R
[58] Field of Search ............................ 277/24, 203, 70, 277/75; 74/459, 424.8 R

[56]   References Cited

U.S. PATENT DOCUMENTS

| | | |
|---|---|---|
| 2,567,483 | 9/1951 | Hotine ........................................ 74/459 |
| 2,757,548 | 8/1956 | Smith et al. . |
| 2,793,538 | 5/1957 | Sears et al. . |
| 2,818,745 | 1/1958 | Spontelli . |
| 3,170,337 | 2/1965 | Linley, Jr. ................................. 74/459 |
| 3,656,358 | 4/1972 | Kopp ......................................... 74/459 |
| 3,669,460 | 6/1972 | Wysong . |
| 3,831,460 | 8/1974 | Linley, Jr. ................................. 74/459 |
| 3,977,269 | 8/1976 | Linley, Jr. . |
| 4,002,083 | 1/1977 | Glicken .................................... 74/459 |
| 4,434,677 | 3/1984 | Linley, Jr. . |
| 4,593,572 | 6/1986 | Linley, Jr. . |
| 4,905,533 | 3/1990 | Benton et al. . |
| 5,178,029 | 1/1993 | Klinkenberg ............................. 74/459 |

FOREIGN PATENT DOCUMENTS

| | | | |
|---|---|---|---|
| 2636841 | 8/1977 | Germany ................................. | 74/459 |
| 626290 | 8/1978 | U.S.S.R. . | |

*Primary Examiner*—Scott Cummings
*Attorney, Agent, or Firm*—Panitch Schwarze Jacobs & Nadel, P.C.

[57]   ABSTRACT

A stripper for a threaded spindle has an essentially ring-shaped body, the inner circumference of which is provided with an internal screw thread (12) that works in cooperation with the carrier screw thread of the threaded spindle. The internal screw thread (12) has at least one recess (14) which is open towards the surroundings of the stripper and which interrupts at least one thread. At least one side edge of the recess (14) runs essentially cross-wise to the threads and is configured as a stripping edge (18), and the screw thread area (16) which carries the stripping edge (18) can be pressed into the carrier screw thread by means of a predetermined force. As a result of this stripper configuration, the topmost layer of the residual film of grease and the abrasive dust found on it can be accurately peeled off, even from the low part of the profile, so that layers of grease that are always clean lie at the points of contact between the shaft bush and the threaded spindle. As a result of the arrangement of additional spring means (20) for pressing the screw thread area (16), an automatic radial adjustment is realized so that the effect of the stripper is constant even when there is severe wear.

14 Claims, 2 Drawing Sheets

STRIPPING RING

FIELD OF THE INVENTION

The present invention pertains to a stripper for a threaded spindle, the stripper having an essentially ring-shaped body, the inner circumference of which is provided with an internal screw thread that works in cooperation with the carrier screw thread of the threaded spindle.

BACKGROUND OF THE INVENTION

Strippers of this type are known per se and are used, for example, in spindle drives on which a tapped bush or a bush containing a spindle nut is arranged and can be displaced on the threaded spindle by means of a relative rotating movement. These known strippers are usually arranged on both ends of the bush, and have the task of cleaning the screw thread area ahead of the spindle nut moving along the threaded spindle and at a distance from this nut, and of preventing the entry of dirt, abraded material or the like into the interior of the bush, since this leads to disproportional wear of the spindle drive and, in the worst case, to a blocking of the spindle drive. As a result of the relative movement of the tapped bush with respect to the threaded spindle, the stripper pushes ahead of it the small particles of dirt and abraded material found on the threaded spindle, so they cannot make their way into the space between the threaded spindle and the spindle nut.

Usually, spindle drives of this type are lubricated with grease, so that a certain residual film of grease remains on the threaded spindle. Along with the small particles of dirt and abraded material, abrasive dust also settles onto this residual film of grease which, however, unlike the small particles of dirt and abraded material, cannot be collected by the stripper. This results in the fact that, as a result of the relative movement of the tapped bush with respect to the threaded spindle, the abrasive dust found on the residual film of grease makes its way between the tapped bush and the threaded spindle and causes wear. The stripper itself also experiences a certain wear as a result of the abrasive dust found on the residual film of grease.

It is even possible for a binding of the spindle drive to occur as a result of the abrasive dust that has entered. Also disadvantageous is the fact that with increasing shaft wear, the effectiveness of the stripper decreases, so that larger and larger particles can make their way in between the shaft bush and the threaded spindle, and thus further accelerate the wear and increase the danger of binding. It is also a disadvantage that the effectiveness of the stripper is dependent on the manufacturing tolerance achieved, since if there is too much play between the stripper and the threaded spindle, the effectiveness of the stripper is significantly reduced.

SUMMARY OF THE INVENTION

Against this background, it is therefore an object of the present invention to make available a stripper that makes it possible to strip off even the finest particles, that has a consistent effectiveness even if there is severe wear, and that is effective regardless of the manufacturing tolerance achieved.

This object is achieved by providing the internal screw thread of the stripper with at least one recess which is open towards the surroundings of the stripper and which interrupts at least one thread, wherein at least one side edge of the recess is configured as a stripping edge, this edge running essentially transverse to the threads, and wherein the screw thread area which bears the stripping edge can be pressed into the carrier screw thread by means of a predetermined force.

As a result of this design in accordance with the invention, it is possible to effectively strip even the smallest particles from the residual film of grease that is found on the threaded spindle. In addition, the stripping edge, which runs crosswise (transverse) to the threads and which corresponds in its shape to the thread profile of the carrier screw thread, is pressed into the carrier screw thread of the threaded spindle by means of a predetermined force, so that the topmost layer of the residual film of grease and the abrasive dust that is found on it can be accurately peeled off, even from the low part of the profile. In this way, layers of grease that are always clean lie at the points of contact between the shaft bush and the threaded spindle.

The contaminated layers of grease that have been peeled off are directed into the recess, which is open towards the stripper's exterior and is dimensioned in such a way that it can hold a sufficient quantity of contaminated grease. The layers of grease that are already in the recess are gradually pushed to the stripper's surroundings by the contaminated layers of grease that are directed into the recess little by little as a result of the peeling process. The stripper thus achieves an outstanding removal of dirt, and a mixing of clean and contaminated layers of grease is prevented.

As a result of the pressing of the stripping edge into the carrier screw thread with a predetermined force, the stripping edge can be matched to the thread profile in the radial direction so that the stripper achieves a consistent effect even when there is severe wear, and the effectiveness of the stripper is also independent of the manufacturing tolerances achieved. In addition, the frictional forces can also be adjusted and varied by means of the selection of the pressing force, so that the necessary compromise between friction and sealing ability can be achieved for the particular requirement in question. Furthermore, the stripper in accordance with the invention exhibits a certain bearing-like effect, through the screw thread area that is being pressed into the carrier screw thread and that bears the stripping edge. This has the overall effect of markedly reducing the play between the tapped bush and the threaded spindle.

While it is indeed possible to generate the pressing force from the elasticity of a certain material region of the stripper itself, in accordance with a preferable further development of the invention, the stripper is provided with additional means for pressing the screw thread area which bears the stripping edge. As a result, it is possible by means of the selection of the appropriate pressing means to press the screw thread area having the stripping edge against the carrier screw thread in an optimal manner in accordance with the requirements at hand.

It is expedient if a number of recesses are provided, distributed around the inner circumference of the internal screw thread. In this way, a large cleaning effect is achieved as a result of the multiplicity of stripping edges even when there is only a slight relative movement between the tapped bush and the threaded spindle, since the stripping edges together cover a larger screw thread area.

One embodiment of the invention provides that the screw thread area portion having a stripping edge is a separate component which can move radially in the direction of the stripper and which can be impinged upon radially from the outside by the pressing means. As a result, in the event of possible wear, it is possible to replace the stripping edge with a new stripping edge quickly and easily and thus at a reasonable cost. In addition, a simple fabrication of the stripping edge is possible, and stripping edges can be used which are made from a material optimally suited to the requirements at hand, so that a broad spectrum of applications is provided for the stripper in accordance with the invention.

An additional preferred embodiment provides that the screw thread area bearing a stripping edge is an area of the internal screw thread which is designed so it can move flexibly in the radial direction of the stripper and which can be impinged upon radially from the outside by the pressing means. With this version of the stripper, an especially easy and rational mass production is possible, for example, by means of injection molding.

In accordance with an especially advantageous further development, the means for pressing the screw thread area having the stripping edges from the outside against the segment of the ring-shaped body having this screw thread area are appropriate spring means. In this way, an automatic radial adjustment of the stripping edges is achieved, so that the stripping edges can automatically adjust to the thread profile in the radial direction both inwardly and outwardly, and can thus be pressed against the threads of the threaded spindle with an essentially constant, consistent pressing force. In addition, in this manner an especially simple compensation for manufacturing tolerances and wear is possible, even in the case of one-sided shaft wear, so that an effective stripping of dirt, abraded particles and the like from the threaded spindle can be done with a consistent effect. In this way, the best stripping results are achieved over a long period of time, even in the case of highly stressed threaded spindles. In an advantageous way, these spring means are endless, ring-shaped, coil spring rings that are under prestress. As a result of the fact that the two ends turn inside one another, the prestress on these coil spring rings can be manually modified simply and quickly, so that in this way a pressing force optimally matched to the requirements at hand can be brought to bear on the stripping edge.

In accordance with one embodiment, the recess is a radial channel in the stripper. A different embodiment provides that the recess is an axial cutout laterally in the internal screw thread of the stripper.

An additional preferred embodiment provides that both side edges of a recess, which run essentially transverse to the threads, are configured as stripping edges. In this way, a stripper that is effective in both directions of rotation is made available, whereby the stripping edges that work in one direction of rotation can be impinged upon by a greater pressing force than the stripping edges that work in the other direction of rotation. In this way, a stripping action can be achieved that is different, depending on the direction of rotation.

In an advantageous way, each of the screw thread segments between adjacent recesses is configured in the same way as this screw thread area which bears stripping edges and which can be pressed, so that the manufacture is further simplified.

In a preferred version of the stripper in accordance with the invention, the ring-shaped body has a bush part which contains the internal screw thread and has a small radial thickness, and which is supported on its outside by means of a circumferential radial web beyond which the bush part projects in the axial direction to at least one side. In addition, with this version the recesses are configured as axial notches in the bush part, and the screw thread areas bearing stripping edges remain as flexible axial tongues of the bush part, each of them between two adjacent cutouts, and are jointly encircled by a prestressed spring ring. As a result, the stripping edges can be easily checked during maintenance, and the stripper, the recesses in particular, can easily be cleaned of contaminated grease.

An advantageous further development of this embodiment provides that the bush part projects beyond the radial web on both sides. That is, alternating axial cutouts, which can extend all the way to the radial web and thus overlap in the circumferential direction, are made in the bush part from both sides. As a result of the variation in the number of axial cutouts, their dimensioning and their extension towards the radial web, both the flexibility in the radial direction of the screw thread area bearing the stripping edge and the flexibility of the bush part itself can be matched to the requirements at hand. In this way, it becomes possible in an especially easy way to make available a stripper that strips in an effective way, both if the shaft has been installed crookedly, or if the shaft is bent, or in the event of localized impairments in the carrier thread of the threaded shaft. In addition, as a result of the increase in flexibility of the stripper per se, a stripper with damping properties is made available which can be used in particular when there are loads that occur in a jolting manner.

The embodiment described in the foregoing expediently has a flange that extends radially, on which means are provided for the fastening of the stripper, for example, at the end of the spindle nut bush of a spindle drive. These means can comprise grooves that are applied to the circumference of the flange and that run radially, into which suitable retaining pins can engage for securing the stripper and fixing it into place. In this way, an especially simple mounting and an especially simple disassembly of the stripper for maintenance and cleaning are made possible.

Preferably, polytetrafluorethylene (PTFE) or ultra-high molecular weight polyethylene (PE-UHMW), for example the PE-UHMW that is available under the name Avalon 37, is selected as the work material for the stripper, so that the stripper is especially wear-resistant, exhibits outstanding resistance to chemicals, as well as good emergency running properties and low initial friction, and is insensitive to very low temperatures and to temperature variations. This choice of material is especially suitable when the stripper is to be used in aircraft construction, since substantial variations in temperature sometimes occur there. The stripper thus remains effective even when the threaded spindles are iced up, since it exhibits an ice-stripping capability as a result of its design.

The stripper can also be made of other materials, however, hard or soft, and plastics or even elastomers, in which case they would then have to fulfill the requirements necessary for the particular application in question.

The invention also includes a spindle drive with a threaded spindle and a bush which is mounted on the latter and which holds a spindle nut and is moved by means of a relative rotating movement, whereby a stripper in accordance with the invention is placed on at least one end of this tapped bush. In conjunction with this, the spindle drive can also be configured as a recirculating ball mechanism.

BRIEF DESCRIPTION OF THE DRAWINGS

The foregoing summary, as well as the following detailed description of preferred embodiments of the invention, will be better understood when read in conjunction with the appended drawings which show further features and advantages of the invention. For the purpose of illustrating the invention, there are shown in the drawings embodiments which are presently preferred. It should be understood, however, that the invention is not limited to the precise arrangements and instrumentalities shown. It can also include combinations of individual features shown, described and/or claimed. In the drawings:

DETAILED DESCRIPTION OF PREFERRED EMBODIMENTS

Figure 1:
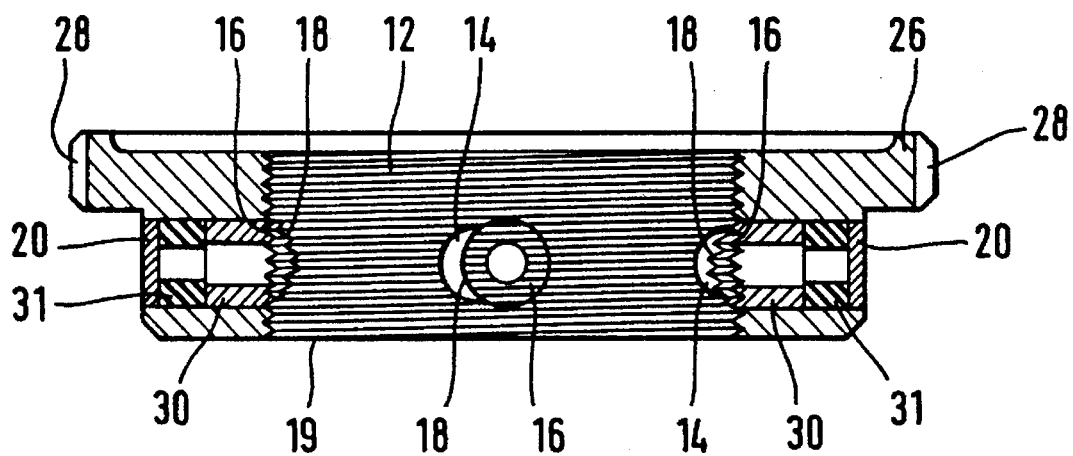
FIG. 1 shows a first embodiment of a stripper, in section.

The stripper shown in FIG. 1 has an essentially ring-shaped body, which is provided with an internal screw thread 12 at its inner circumference. The internal screw thread 12 has four recesses 14 spaced at equal distances from each other and arranged along one circumferential line, only two of which can be seen as a result of the selected sectional representation. Each of the recesses 14 is configured as a radial channel in the stripper, and one side edge of each recess 14 is configured as a stripping edge 18. In conjunction with this, each of the screw thread areas 16 having the stripping edge 18 is configured as a separate component 30 that is movable in the radial direction of the stripper.

At the outer circumference of the stripper there is placed a retaining ring 20 which holds the elastic intermediate elements 31 in the stripper. These intermediate elements 31 are elastically deformed between the retaining ring 20 and the separate components 30, so that the intermediate elements 31 press the separate components 30 towards the inside with a predetermined force. At its outer circumference the stripper has, in addition, a circumferential flange 26 which extends radially. On the outer circumference of this flange 26 there are arranged grooves 28 which run axially and by means of which the stripper can be fastened and secured to a tapped bush through appropriate means.

The stripper shown can be screwed onto a threaded spindle (not shown), and then fastened and secured by means of the grooves 28 located on the flange 26 to a tapped bush (also not shown), to a planetary mother housing, or to something similar. In addition, dowel pins or the like, for example, can be used. As a result of the relative movement between the tapped bush and the threaded spindle, the stripper then strips off the dirt found on the threaded spindle, whereby it pushes the large particles of dirt ahead of it with its outer edge 19 in a known manner, and with its stripping edges 18 peels off the top layers of the residual film of grease, which contain the fine particles of dirt.

These peeled layers of grease are directed into the recesses 14, so that the contaminated layers of grease and the clean layers of grease are kept separate from each other. As a result of the peeled-off layers of grease being directed into the recess 14, the contaminated grease contained inside the recess 14 is gradually conveyed in a radial direction towards the stripper's external surroundings. Since the stripper has a stripping edge 18 on only one side of the recess 14, it only works in one direction of rotation.

Figure 1A:
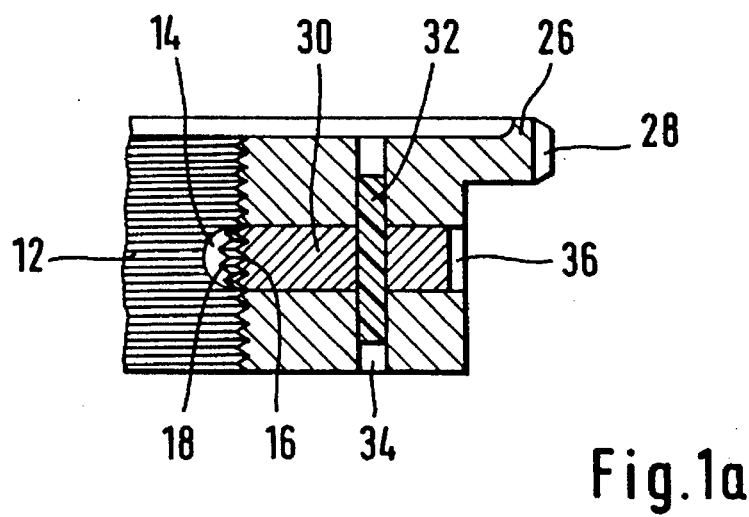
FIG. 1a shows a modification of the stripper in accordance with FIG. 1.

In FIG. 1a is shown a detail of the embodiment in accordance with FIG. 1, with a somewhat modified arrangement of the separate component 30. The separate component 30 comprises an essentially cylindrical pin which is supported in a radial bore 36. The inwardly-directed point of the separate component 30, has a screw thread area 16, on the border of which pointing towards the recess 14 a stripping edge 18 is arranged. Perpendicular to the radial bore 36, a bore 34 runs axially in the stripper, whereby the center lines of the axial bore 34 and radial bore 36 intersect. In addition, the separate component 30 has a bore running perpendicular to the central axis of the separate component 30 and corresponding in its diameter with the diameter of the axial bore 34.

The separate component 30 is then fastened in the stripper by first being pressed into the radial bore until the screw thread area 16 projects inwardly slightly past the internal screw thread 12 of the stripper. The bore in the separate component 30 is then placed in such a way that it coincides with the axial bore 34. An essentially pin-shaped elastic element 32 is now inserted in this axial bore 34, and is pushed all the way through the bore in the separate component 30 so that it is supported in the axial bore 34 on both sides of the separate component 30. In conjunction with this, the elastic element 32 possesses a certain oversize with respect to the axial bore 34, so that it is firmly jammed in the axial bore 34. As a result of the above-described supporting of the separate component 30 in the stripper, this separate component 30 is now supported both so it cannot twist, but also so it is flexible and is pressed with a predetermined force against the carrier screw thread on the threaded shaft (not shown). In this regard, the separate component 30 is supported in the radial bore 36 with a certain play, so that in combination with the flexible support by the elastic element 32, localized impairments of the carrier screw thread of the threaded shaft (not shown) can be compensated for.

Figure 2:
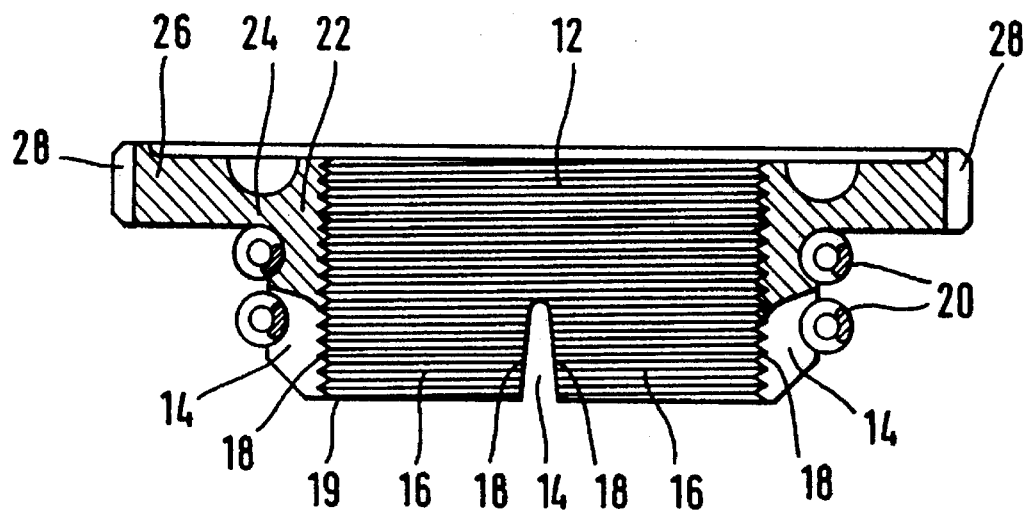
FIG. 2 shows a second embodiment of a stripper, in section.

The embodiment of a stripper shown in FIG. 2 has a bush part 22 on which the internal screw thread 12 is provided. At an end region, the bush part 22 has on its outside a circumferential radial web 24, by means of which it is supported and joined with a flange 26 located on the outer circumference of the stripper and extending radially. The flange 26 has on its circumference grooves 28 which run radially and by means of which the stripper can be fastened and secured by suitable means to a tapped bush (not shown), or to something of that type.

The bush part 22 has, in addition, four recesses 14, which are located at equal distances from each other around the circumference of the bush part. These recesses 14 are configured as axial notches in the end of the bush part 22 opposite the radial web 24. The two sides of each recess 14 are configured as stripping edges 18, and the screw thread area 16, which bears the stripping edges 18 and lies between each two recesses 14, is configured as a flexible, axial tongue as a result of the small radial thickness of the bush part 22. On the outer circumference of the bush part 22 are arranged two prestressed coil spring rings 20, so that the screw thread area 16 which carries the stripping edges 18 is pressed inwardly with a predetermined force.

As a result of the stripping edges 18 arranged on both sides of the recesses 14, the stripper 10 thus works in both directions of rotation. In this regard, in one direction of rotation the outer edge 19 also acts as an additional stripping edge, while in the opposite direction only the stripping edges 18 on the corresponding sides of the recesses 14 are working. The contaminated layers of grease peeled off by the stripping edges are conveyed into the recesses 14, so that the contaminated layers of grease and the clean layers of grease are kept separated from each other.

Figure 3:
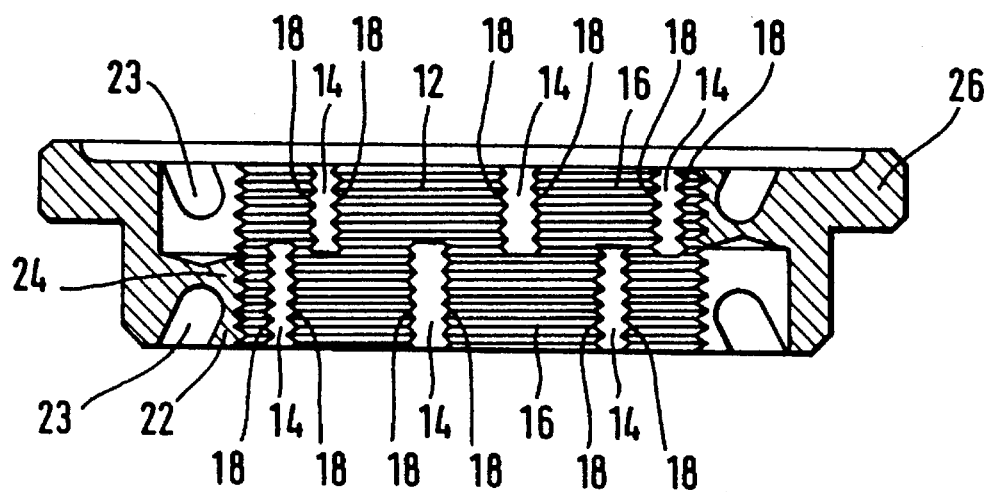
FIG. 3 shows a third embodiment of a stripper, in section.

A third embodiment of a stripper is shown in FIG. 3 in section. This stripper has a ring-shaped body into which circumferential grooves 23 have been made on both sides. These grooves delimit a radial web part 24 on both sides, and on its side facing radially inwardly, a relatively thin-walled bush part 22 is created and delimited by these grooves and extends about the same distance from the web part 24 in both axial directions. The side of the bush part 22 facing radially inwardly has the internal screw thread 12, as in the embodiments described previously.

On both sides of the ring-shaped body, there are now made in the region of the grooves 23 alternating blind bores, which extend beyond the radial center plane of the body and which therefore overlap each other in the circumferential direction. The bores are made in such a way that on their sides pointing radially inwardly, each of them also removes a region of the screw thread 12, as a result of which the recesses 14 and their stripping edges 18 appear in the screw thread 12. Because of the relatively small radial thickness of the bush part 20, the screw thread areas 16 left between two adjacent recesses 14 represent flexible tongues, each of which extends axially from the center of the stripper towards the outside, and which deforms under the influence of a force directed radially inwardly and can be pressed against the screw thread of a spindle on which the stripper has been placed.

The grooves 23 which have been made in the stripper body and which delimit the bush part 22 radially outwardly also serve at the same time to hold coil spring rings of the type shown in FIG. 2 (not shown in FIG. 3 for purposes of clarity only) by means of which a specific pressing force is exerted on the screw thread area 16 of the tapped bush 22. In order that the ring-shaped coil springs remain securely in their seats, the grooves 23 are formed in the stripper body at a slight angle, as can be seen in the representation in FIG. 3.

On its outside, the stripper represented in FIG. 3 also has a circumferential flange 26, which extends radially and which is used for the fastening of the stripper to a component on which it is to be mounted. The flange can, for example, contain screw holes (not shown).

If, both in the embodiment in FIG. 2 and in the embodiment of FIG. 3, two stripper edges 18, which laterally delimit a flexible screw thread area 16 and each of which comes into use with opposite directions of rotation, are to be impinged upon with differing pressing forces in order to press them to different depths or into the carrier screw thread with varying degrees of force, the flexible screw thread tongues 16 can, for example, be configured in such a way that they exhibit a thickness which varies in the circumferential direction. This can, for example, be brought about by means of the fact that their radially outward facing contour does not run concentrically with the stripper, so that a coil spring ring mounted on the outside of the screw thread area 16 presses the thicker sides of the area 16 more firmly and thus more deeply into the carrier screw thread.

In this way, it is possible to achieve a different stripping effect by the stripper in the two directions of rotation, which can be desirable if, for example, the spindle-drive bush containing a spindle nut is provided with a stripping ring at both ends at a distance from the spindle nut.

If the bush trails behind the stripping ring during its movement on the spindle, a stripping effect can then be used that is harder than that used in the reverse direction, whereby the stripper trails behind the spindle nut and does indeed lift the foreign bodies up out of the carrier screw thread, but conveys them towards the interior of the bush.

The embodiment in accordance with FIG. 3, in which the recesses 14 are created by means of blind bores, also has the advantage that the stripping edges 18 are not created by purely radial cuts, but rather the screw thread ridges of the stripper project at an angle forward and down into the recess 14, and thus into the carrier screw thread that is to be cleaned. They are thus given, in addition, the wedge effect of a scraper.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A stripper for a threaded spindle having a carrier screw thread, the stripper comprising:

a ring-shaped body having inner and outer opposing axial surfaces, the inner axial surface including an internal screw thread (12) for working in cooperation with the carrier screw thread of the threaded spindle, the inner axial surface having a radial channel (14) extending radially outwardly therefrom to the outer axial surface and interrupting the internal screw thread, the radial channel (14) including first and second circumferential portions;

a radially extending component (30) positioned within the first circumferential portion of the radial channel (14) and having a screw thread area (16) substantially coextensive with the inner axial surface, the screw thread area (16) forming an axially extending stripping edge (18) adjacent the second circumferential portion of the recess (14); and a pressing component (20, 32) pressing radially inwardly on the radially extending component (30) to press the stripping edge (18) into contact with the carrier screw thread.

2. The stripper according to claim 1, wherein the pressing component (20) is positioned adjacent the outer axial surface of the ring-shaped body.

3. The stripper according to claim 2, wherein the pressing component (20) comprises at least one retaining ring.

4. The stripper according to claim 1, comprising a plurality of radial channels (14) circumferentially distributed around the ring-shaped body and a corresponding plurality of radially extending components (30) positioned within the radial channels (14).

5. The stripper according to claim 4, wherein each screw thread segment between adjacent radial channels (14) is configured in the same way as the screw thread area (16).

6. The stripper according to claim 1, wherein the stripping edge (18) is a first stripping edge (18), and wherein, the screw thread area (16) of the radially extending component (30) forms a second axially extending stripping edge (18) substantially opposite the first stripping edge (18), each of the first and second stripping edges (18) being oriented substantially axially with respect to the ring-shaped body.

7. The stripper according to claim 1, further comprising a flange (26) extending radially therefrom, on which means (28) are provided for fastening the stripper (10) to a threaded spindle.

8. The stripper according to claim 1, wherein the ring-shaped body is formed from a material selected from the group consisting of PTFE and PE-UHMW.

9. A stripper for a threaded spindle having a carrier screw thread, the stripper comprising:

a ring-shaped body having:
  a bush part (22) including inner and outer opposing axial surfaces and first and second opposing radial sides, the inner axial surface including an internal screw thread (12) for working in cooperation with the carrier screw thread of the threaded spindle, the bush part (22) having a plurality of recesses (14) circumferentially distributed therearound, each recess (14) being an axial notch in the first radial side of the bush part (22) and interrupting the internal screw thread (12) on the inner axial surface;
  a relatively thin circumferentially continuous radial web (24) circumferentially surrounding and supporting the bush part (22), the first radial side of the bush part (22) projecting axially with respect to the radial web (24);
  a flange (26) integral with and extending radially from said radial web;
  a plurality of screw thread areas (16) on the internal screw thread (12), each screw thread area (16) being circumferentially adjacent a corresponding recess (14) and being radially flexibly movable, each screw thread area (16) forming an axially extending stripping edge (18) adjacent the recess (14); and
  at least one pre-stressed spring ring (20) pressing radially inwardly on the outer axial surface of the bush part (22) adjacent the screw thread areas (16), wherein the spring ring (20) presses each stripping edge (18) into contact with the carrier screw thread.

10. The stripper according to claim 9, further comprising means (28) on said flange (26) for fastening the stripper (10) to a threaded spindle.

11. The stripper according to claim 9, wherein the ring-shaped body is formed from a material selected from the group consisting of PTFE and PE-UHMW.

12. A stripper for a threaded spindle having a carrier screw thread, the stripper comprising:
  an essentially ring-shaped body having:
    a bush part (22) including inner and outer opposing axial surfaces and first and second opposing radial sides, the inner axial surface including an internal screw thread (12) for working in cooperation with the carrier screw thread of the threaded spindle, the bush part (22) having a plurality of recesses (14) circumferentially distributed therearound, the recesses (14) including first recesses (14) in the first radial side of the bush part (22) and second recesses (14) in the second radial side of the bush part (22), each of the first and second recesses (14) being an axial notch and interrupting the internal screw thread (12) on the inner axial surface; and
    a relatively thin circumferentially continuous radial web (24) circumferentially surrounding and supporting the bush part (22), the first radial side and the second radial side of the bush part (22) each integral with and projecting axially with respect to the radial web (24);
    a plurality of screw thread areas (16) on the internal screw thread (12), each screw thread area (16) being circumferentially adjacent a corresponding recess (14) and being radially flexibly movable, each screw thread area (16) forming an axially extending stripping edge (18) adjacent the recess (14); and
    pre-stressed spring rings (20) pressing radially inwardly on the outer axial surface of the bush part (22) adjacent the screw thread areas (16), wherein the spring rings (20) press each stripping edge (18) into contact with the carrier screw thread.

13. The stripper according to claim 12 further comprising a flange (26) extending radially therefrom, on which means (28) are provided for fastening the stripper (10) to a threaded spindle.

14. The stripper according to claim 12, wherein the ring-shaped body is formed from a material selected from the group consisting of PTFE and PE-UHMW.

* * * * *